No. 716,033. Patented Dec. 16, 1902.
H. M. HARDING.
OVERHEAD ELECTRIC CARRIER AND HOISTING DEVICE.
(Application filed Jan. 16, 1902.)
(No Model.)
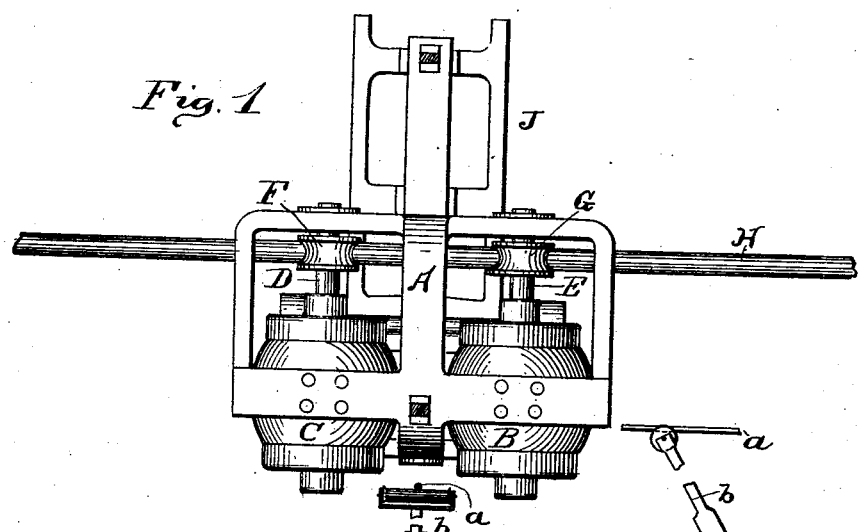
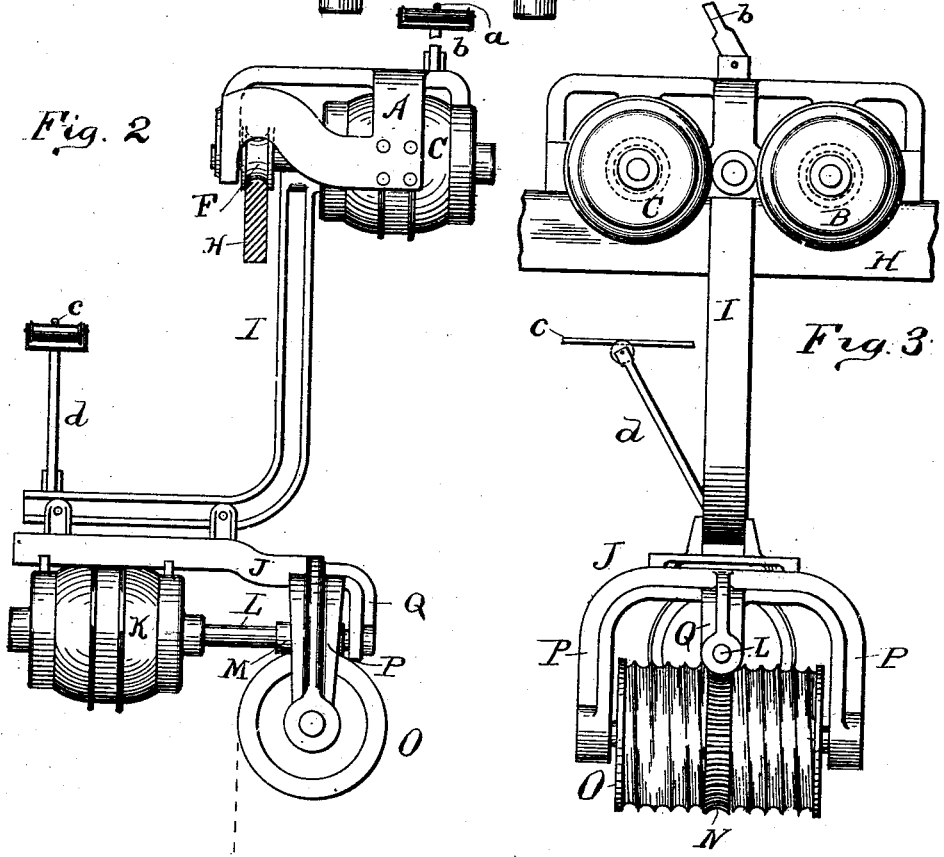
Witnesses
Inventor
Henry M. Harding
By his Attorneys

UNITED STATES PATENT OFFICE.

HENRY M. HARDING, OF NEW YORK, N. Y.

OVERHEAD ELECTRIC CARRIER AND HOISTING DEVICE.

SPECIFICATION forming part of Letters Patent No. 716,033, dated December 16, 1902.

Application filed January 16, 1902. Serial No. 89,934. (No model.)

*To all whom it may concern:*

Be it known that I, HENRY M. HARDING, a citizen of the United States, and a resident of the city, county, and State of New York, have invented certain new and useful Improvements in Overhead Electric Carriers and Hoisting Devices, of which the following is a specification.

In the drawings forming part of this specification, Figure 1 is a plan view. Fig. 2 is a side elevation. Fig. 3 is an end view of the carrier embodying my invention.

A represents the framework, carrying electric motors B C, on the shafts D and E of which are carried grooved wheels F G, which run on the rail H, supported in any suitable manner. Depending from the framework is a curved arm I, the lower part being bent at right angles to the upper part and being turned in a direction opposite to the position of the motors. Supported on the horizontal part of the arm I is a frame J. Carried by this frame and immediately under the horizontal arm is a motor K. The shaft L of the motor has thereon a worm M, which meshes with the worm-wheel N, carried by a winding-drum O, supported on shafts having bearings in forwardly-projecting arms of a bracket P, supported from the arm I. This bracket also carries a forwardly-projecting arm Q, in which is journaled one end of the shaft L.

The motors B, C, and K receive their power from any suitable source of supply, which is not shown, and may be governed and controlled by the usual electrical appliances. I intend usually that the motors B C shall secure their current by means of an overhead wire *a* and trolley *b* in the well-known manner. The motor K will receive its power from a wire *c* and trolley *d* in the usual manner.

The drum O is intended to hoist the material to be conveyed. It will be noted that this drum is so supported that the direction of application of the weight (indicated by the dotted line in Fig. 2) will be directly under the point of support of the arm I. The length of the horizontal arm I and the point of attachment of the bracket carrying the motor and drum are so arranged that the weights will be in equilibrium. The weight carried by the drum occupies a position indicated by the dotted line in Fig. 2, by which it will be seen that the point of support of weight is directly under the center of the wheel running along the rail, and thus no matter what weight is carried the apparatus will still be in equilibrium on the rail.

The operation of the device is as follows: Power being supplied to the motors B C, the apparatus travels to the place from which material is to be transported, and there the electric hoisting device being put in operation by the motor K the material is hoisted to the desired height. The motors B C are then put in operation, and the carrier moves to the point desired, where it is stopped and the load lowered.

In the illustration I have shown my invention as applied to a side-bearing telpher; but it is obvious that it may be applied to a center bearing or any other form which it may be desirable to use.

I have not indicated the wiring of the electrical apparatus, as that may be done in any way desirable or in the well-known manner.

What I claim, and desire to secure by Letters Patent, is—

1. In an overhead carrier and hoisting device, the combination of a motor, a track on which said motor travels, an arm depending from said motor, the lower end of said arm being bent at an angle, and an electric hoisting device supported on said angular portion, substantially as described.

2. In an overhead carrier and hoisting device, the combination of a frame, an electric motor supported thereby, a track on which said motor travels, a bent arm carried by said motor, an electric hoisting device carried by said arm, the parts being so arranged as to be in equilibrium, substantially as described.

3. In an overhead carrier and hoisting device, the combination of a motor, a rail on which said motor travels, a bent arm depending from said motor, an electric motor on said arm, and a worm-gear hoist actuated thereby, substantially as described.

In testimony whereof I have hereunto set my hand, in the city, county, and State of New York, this 10th day of January, 1902.

HENRY M. HARDING.

In presence of—
E. M. HARMON,
LOUIS N. WHEALTON.